US005698664A

United States Patent [19]
Allcock et al.

[11] Patent Number: 5,698,664
[45] Date of Patent: Dec. 16, 1997

[54] SYNTHESIS OF POLYPHOSPHAZENES WITH CONTROLLED MOLECULAR WEIGHT AND POLYDISPERSITY

[75] Inventors: Harry R. Allcock; Christopher T. Morrissey, both of State College, Pa.; Ian Manners, Oakville; Charles H. Honeyman, University of Toronto, both of Canada

[73] Assignees: The Penn State Research Foundation, University Park, Pa.; University of Toronto, Toronto, Canada

[21] Appl. No.: 429,521

[22] Filed: Apr. 26, 1995

[51] Int. Cl.$^6$ .............................. C08G 73/00; C08G 79/00
[52] U.S. Cl. .................. 528/399; 528/167; 528/168; 528/169; 528/223; 528/224; 528/225; 528/228; 528/287; 525/538
[58] Field of Search ...................... 528/399, 363, 528/392, 167, 168, 169, 223, 337, 336, 225, 228, 287, 321, 271, 224; 525/538

[56] References Cited

U.S. PATENT DOCUMENTS

| | | | |
|---|---|---|---|
| 4,440,921 | 4/1984 | Allcock et al. | 528/168 |
| 4,535,147 | 8/1985 | Myers | 528/321 |
| 4,880,622 | 11/1989 | Allcock et al. | 514/772.3 |
| 5,053,451 | 10/1991 | Allcock et al. | 524/600 |
| 5,149,543 | 9/1992 | Cohen et al. | 424/499 |
| 5,248,585 | 9/1993 | Lynch et al. | 430/326 |

OTHER PUBLICATIONS

Allcock, Polyphosphazenes, Journal of Inorganic and Organometallic Polymers, (1992), 197–211, vol. 2. The month of publication is not available.

Allcock, et al., Polyphosphazenes with Etheric Side Groups: Prospective Biomedical and . . . , Macromolecules , (1986) pp. 1508–1512, vol. 19. The month of publication is not available.

Blonsky, et al., Polyphosphazene Solid Electrolytes, J. Am. Chem. Soc., (1984), pp. 6854–6855, vol. 106. The month of publication is not available.

Mark, et al., Polyphosphazenes, Inorganic Polymers, Chptr. 3, pp. 61–140, Prentice Hall, Englewood Cliffs, New Jersey. The month of publication is not available.

Neilson, et al., Poly(alkyl/arylphosphazenes) and Their Precursors, Chem. Rev., (1988), pp. 541–562, vol. 88. The month of publication is not available.

Matyjasezewski, et al., New Synthetic Routes Towards Polyphosphazenes, Makromol. Chem., Macromol, Symp., (1992), pp. 13–30, vol. 54/55. The month of publication is not available.

Honeyman, En Route to New Inorganic Rings and Polymers: The Reactions of Chlorine R Phosphorus=Nitrogen Silicon Trimethyl (R = Cl or Ph) . . . , Thesis, (1992), Univ. of Toronto. The month of publication is not available.

Honeyman, et al., Synthesis and Structures of the Halogenated Tungsten (VI) . . . , Inorg. Chem., (1994), pp. 2988–2993, vol. 33. The month of publication is not available.

Niecke, et al., Inorganic and Nuclear Chemistry Letters, (1973), pp. 127–129, vol. 9. The month of publication is not available.

*Primary Examiner*—James J. Seidleck
*Assistant Examiner*—P. Hampton-Hightower
*Attorney, Agent, or Firm*—Thomas J. Monahan

[57] ABSTRACT

A process for the preparation of polyphosphazenes is provided that includes the cationic solution polymerization reaction of a phosphoranimine, using a main group or transition metal halide, or other appropriate halide salt, including a linear phosphazene salt of any chain length, or a preformed nonphosphazene polymer containing a main or transition metal chloride, as an initiator.

31 Claims, No Drawings

SYNTHESIS OF POLYPHOSPHAZENES WITH CONTROLLED MOLECULAR WEIGHT AND POLYDISPERSITY

The U.S. Government has rights in this invention arising out of the partial funding of work leading to this invention through one or more grants from the U.S. Office of Naval Research.

FIELD OF THE INVENTION

This invention is in the area of polymer synthesis, and in particular, is a convenient and mild process for the preparation of polyphosphazenes having controlled molecular weight and polydispersity. The process also provides a convenient route for the preparation of block copolymers of polyphosphazenes.

BACKGROUND OF THE INVENTION

Polyphosphazenes are a broad and well known class of macromolecules based on the repeating unit —$(NPR_2)_n$—, wherein R is a wide range of organic or inorganic substituent groups. It has been estimated that by the end of 1990 roughly 300 types of polyphosphazenes had been synthesized and characterized, approximately 2000 publications and patents had appeared, and disclosures were appearing at a rate of 170–200 per year on this class of polymers. Polyphosphazenes, *J. of Inorganic and Organometallic Polymers*, 1992, 2(2), 197–211.

The predominant route to polyphosphazenes to date has been through the thermal polymerization of hexachlorocyclotriphosphazene, also referred to as phosphonitrilic chloride, to poly(dichlorophosphazene) (which has an IUPAC name of poly (nitrilodichlorophosphoranetriyl). This route is illustrated in Scheme 1 below.

Scheme 1
Polymerization of Hexachlorocyclotriphosphazene

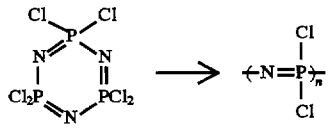

Although polydichlorophosphazene is a hydrolytically unstable elastomer, it can be converted to a wide range of derivatives by macromolecular nucleophilic substitution reactions with a broad variety of nucleophiles. As illustrated in Scheme 2 below, poly(organophosphazenes) are generally prepared by reacting one or more organic or organometallic nucleophiles with poly(dichlorophosphazene). See, for example, Allcock, H. R.; Austin, P. E.; Neenan, T. X.; Sisko, J. T.; Blonsky, P. M.; Shriver, D. F. *Macromol.*, 1986, 19, 1508, and Blonsky, P. M.; Shriver, D. F.; Austin, P. E.; Allcock, H. R. *J. Am. Chem. Soc.* 1984, 106, 6854.

Scheme 2
Synthesis of Poly(organophosphazenes)

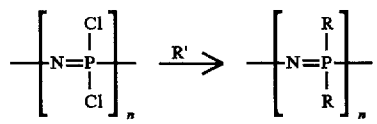

R = organic nucleophile

The properties of the resulting polymers are largely determined by the substituent groups on the polymer backbone. By appropriate selection of the substituent groups, one can obtain a phosphazene polymer with, for example, a target glass transition temperature; target physical characteristics such as film forming properties; organogel or hydrogel behavior; desired hydrophobicity or hydrophilicity; amorphous or microcrystalline character; and advanced liquid crystalline, photochromic, or non-linear optical properties. Mark, J. E.; Allcock, H. R.; West, R. *Inorganic Polymers* Prentice Hall: Englewood Cliffs, N.J. 1992 Chapter 3.

Another synthetic route for the production of polyphosphazenes is the Neilson-Wisian-Neilson reaction.

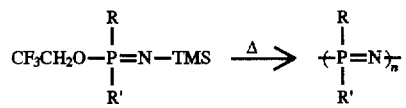

Neilson et al., *Chem. Rev.* 1988, 88, 541. The disadvantages of the Neilson-Wisian-Neilson route include high polymerization temperature, difficult monomer synthesis, the ability to prepare only a limited number of polymers, and little molecular weight control.

The Flindt-Rose Matyjaszewski route for the production of polyphosphazenes involves the following reaction.

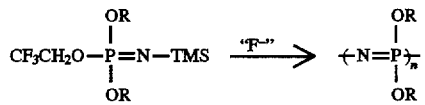

*Makromol. Chem. Macromol. Symp.* 1992, 54155, 13. The polymerization temperature of this reaction can be as low as 90° C. The reaction produces polymers with fairly narrow polydispersites (<1.4). The reaction, however, cannot be used to prepare the important synthetic tool poly (dichlorophosphazene). Block copolymers of the type [NP $(OR_1)_2]_x[NP(OR_1)(OR_2)]_y$, wherein $R_1$ is halogenated alkoxy and $R_2$ is an aliphatic or aryl moiety, can be prepared using this reaction. The synthesis of the monomers necessary for this reaction can be difficult.

Yet another synthetic approach to polyphosphazenes is the Hornbacker and Li reaction.

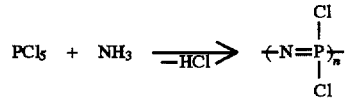

This method requires high temperatures and does not provide control over molecular weight. The products do not have narrow polydispersities.

The DeJaeger synthesis provides polydichlorophosphazenes using the following protocol.

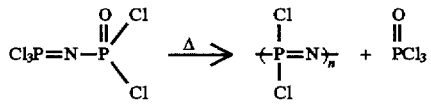

This method allows for some molecular weight control, but cannot produce polymers with narrow polydispersities. This route also requires high reaction temperatures.

Azides have also been used to prepare polyphosphazenes.

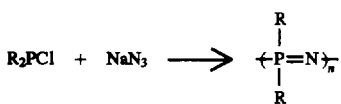

This route is potentially dangerous, does not allow molecular weight control and cannot produce polydichlorophosphazene.

Thus each of the existing routes for the preparation of polyphosphazenes has one or more disadvantages, including complicated monomer synthesis, difficult polymer synthesis, or elevated polymerization temperatures that allow only limited ranges of polymers to be produced.

An important disadvantage of these methods is that it is difficult to prepare or control the molecular weight and polydispersity of the important polymer, poly (dichlorophosphazene). Other polyphosphazenes limited to very specific substituent groups, for example, [NP $(OCH_2CH_3)_2]_n$ can be produced with controlled molecular weights and fairly narrow polydispersities.

Polydispersity is a measure of the molecular weight nonhomogeneity of a polymer sample. Polydispersity is calculated by dividing the weight average molecular weight ($M_w$) of the polymer by the number average molecular weight ($M_n$). The value of $M_w/M_n$ is unity for a perfectly monodisperse polymer. The thermal polymerization of hexachlorocyclotriphosphazene, for example, results in a molecular weight of $10^5$–$10^6$ or greater. The polydispersity Index (PDI) for these polymers is typically 2 or higher.

It is known that polymers with narrow polydispersity are easier to crystallize, have a sharper glass transition temperature, and flow more suddenly at a given temperature than the same polymer with a broader polydispersity. The polydispersity of polymers used for drug delivery affects the hydrolyric degradation and release properties of the delivery device. For this reason, the U.S. Food and Drug Administration now requires that polymers for medical applications such as drug delivery have a very narrow polydispersity.

The absolute molecular weight, as opposed to the range of molecular weight, of a polymer sample is also of prime importance in its behavior in industrial and medical applications. Most important mechanical properties vary considerably with weight average molecular weight. For example, strength increases rapidly with increasing molecular weight until a critical point is reached. The ability to process polymers into useful articles such as film, sheet, pipe, or fiber also increases as molecular weight increases to a point, and then decreases past a point as the viscosity becomes too high. Thus it is often desirable to obtain a high but specified, compromise molecular weight that optimizes strength and processability in a concerted fashion. This illustrates the need to control molecular weight during synthesis.

Given the versatility of the route of preparation of polyphosphazenes through substitution reactions with polydichlorophosphazene, the development of improved methods for the synthesis of poly(dichlorophosphazene) having low polydispersity and controlled molecular weight is extremely important from both an industrial and an academic viewpoint.

In 1992, it was reported in the Master's Thesis of Charles H. Honeyman (Department of Chemistry, University of Toronto) that the phosphoranimine $Cl_3P=NSi(CH_3)$ acted as a monomer for the room temperature neat (i.e., without solvent) synthesis of high molecular weight linear poly (dichlorophosphazene). In a similar fashion, $Cl_2$(phenyl) P=NSi(CH$_3$) yielded poly(phenylchlorophosphazene), —[N=P(phenyl)(chloro)]$_n$—. Both of these polymers were derivatized via macromolecular substitution reactions with sodium trifluoroethoxide to provide the high molecular weight polymers, —[N=P(OCH$_2$CF$_3$)]$_n$—and —[N=P (Ph)(OCH$_2$CH$_3$]—, respectively. The —[N=P(OCH$_2$CF$_3$) ]$_n$—produced from polydichlorophosphazene using this process had a PDI of 2.2. This bulk process, however, has provided certain polyphosphazenes with a PDI as low as 1.8. The —[N=P(Ph)(OCH$_2$CF$_3$]—produced had a PDI of 1.4. The bulk process cannot produce lower molecular weight polymers with a narrow PDI.

While the Honeyman 1992 process represented an advance in the art of preparation of polyphosphazenes, there remains a need to further, narrow the polydispersity of the polymer to approach a monodisperse product. There also remains a need to have a process for the production of polyphosphazenes that allows one to obtain a product of desired molecular weight by the appropriate selection of the starting materials and reaction conditions. Currently, the catalyzed ring-opening polymerization and DeJaeger routes may allow for control of MW but only at high temperatures (above 200° C.) and not with a narrow PDI.

In particular, since the route of preparation of polyphosphazenes through substitution reactions with polydichlorophosphazene appears to be the most useful entry into this class of compounds, it would be of value to have a process that provides low dispersity polydichlorophosphazene.

Therefore, it is an object of the present invention to provide a process for the production of polyphosphazenes, and in particular polydichlorophosphazene, that results in a product with narrow polydispersity.

It is a further object of the present invention to provide a process for the production of polyphosphazene, and in particular, polydichlorophosphazene, which results in the controllable production of polymers of a desired molecular weight.

It is another object of the present invention to provide a process for the production of polyphosphazene block copolymers that results in a product with narrow polydispersity and a desired molecular weight.

It is another object of the present invention to provide a method for the production of polydichlorophosphazenes having controlled molecular weight that is conducted under ambient conditions.

It is a still further object of the present invention to provide polyphosphazenes and polyphosphazene block copolymers of narrow polydispersity.

SUMMARY OF THE INVENTION

A process for the preparation of polyphosphazenes is provided that includes the cationic solution polymerization reaction of a phosphoranimine, using a main group or transition metal halide, or other appropriate halide salt, including a linear phosphazene salt of any chain length as an initiator. In an alternative embodiment, the initiator is a preformed nonphosphazene polymer containing a main or transition metal chloride. The initiator is incorporated into the polymer as an endgroup.

Importantly, this reaction provides a polyphosphazene with narrow polydispersity. It was surprisingly discovered that a reaction of a phosphoranimine with an appropriate halide salt consistently provides a significantly more narrow polydispersity when conducted in solution than when conducted neat (i.e., without a solvent).

This method is a significant advance in the art of polyphosphazene synthesis, in that for the first time, one can specifically control the molecular weight of poly (dichlorophosphazene). The molecular weight of the product is controlled, for example, by the monomer to initiator ratio, by the addition of monomer to preformed active or living chains, or by the control of the duration of the reaction. The choice of initiator can influence the polymerization rate which can increase control of molecular weight. This control is only possible in the disclosed solution reaction, and was not possible using the Honeyman 1992 neat synthesis.

Another advantage of this reaction is that the reaction proceeds under mild conditions, typically at ambient temperature. This room temperature synthesis is a significant advance over the prior procedure of the ring opening of a hexachlorocyclotriphosphazene to produce polydichlorophosphazene at 200°–250° C. The synthesis allows for the polymerization of monomeric phosphoranimines that contain groups that decompose, rearrange or generate undesired species at elevated temperatures, for example, above 90° C.

The room temperature synthesis can be carried out to achieve 100% conversion of the phosphoranimine to polyphosphazene without crosslinking the product. This can be compared to the ring-opening polymerization of hexachlorocyclotriphosphazene, which typically undergoes crosslinking reactions above 70% conversion, resulting in lower yields of product.

The chain ends in this process are active throughout the duration of the polymerization as well as active after the total consumption of the monomer. By "active" it is meant that the ends are in a reactive state, and specifically, in a cationic state. They are thus available as additional reaction sites for polymerization or derivatization. The chain ends can be deactivated in any appropriate fashion, for example, with an oxygen source or by nucleophiles. The polymer can be reacted with, for example, $SO_3$, NaOR, or $NH_2R$, wherein R is an aliphatic or aromatic group. $SO_3$ can react selectively with the end group to deactivate propagation. NaOR and $NH_2R$ may react with the end group and the polymer chain indiscriminately. However, the use of these compounds in producing polymers makes these convenient choices. Hydride sources may also selectively react with the endgroup.

In one embodiment, a moiety is reacted with the cationic polymer end that contains a second functional group that can be used to link another desired moiety to the polymer. Alternatively, a desired moiety is reacted directly with the cationic polymer end to affect a physical property of the polymer such as solubility, glass transition temperature, lipophilicity, morphology, creep, crystallinity, bulk modulus, viscosity, conductivity, refractive index or thermal stability. In an alternative embodiment, a moiety can be added to the polymer that imparts specific biological properties to the polymer, such as cationic charge (e.g., polylysine or other positive charge-bearing species, for tissue adherence), or provides a site for the attachment of a biologically active molecule.

Block copolymers of polyphosphazenes can be prepared using at least three different methods. In a first embodiment, a block copolymer is prepared by the cationic polymerization of monomers initiated by the active end groups of the polyphosphazene. Any monomer or polymer capable of reacting with a cationic site can be used. As an example, a block copolymer of polyphosphazene and polyalkylene glycol, for example, polyethylene glycol (PEG), can be prepared through any of the above routes. A PEG endgroup can be used thereafter to polymerize $Cl_3$PNTMS and the resultant polymer can be treated with NaOR to provide any number of desired blocks. The active organic block can be reacted with phosphoranimine monomer, that is the same as or different from that used in the first phosphazene polymer block. This procedure can be continued as long as desired using any variety of reactive organic and phosphoranimine monomers. Blocks should be added prior to substitution of —Cl on the polyphosphazene backbone with a nucleophile, since Cl substitution can deactivate chain ends.

Additionally, other phosphoranimine monomers can be used to create phosphazene-phosphazene blocks. As a non-limiting example, after polymerizing $Cl_3$PNTMS to $NPCl_2$, (Ph) $Cl_2$PNTMS can be added to form $[NPCl_2]_x[NP(Ph)Cl]_y$, wherein x and y indicate independent repeating units.

In a second embodiment for the production of block copolymers of polyphosphazenes, functionalized compounds are reacted with the active polyphosphazene end that have a moiety that will initiate a reaction mechanism other than cationic polymerization, for example, anionic or radical initiation. Any initiator that can be attached to the end of a polymer chain and is incorporated into the second block can be used. For example, an endcap with a bromophenyl moiety can be converted to an appropriate organometallic species, for example, a grignard or organolithium reagent, to initiate anionic polymerization of appropriate monomers. Alkene moieties can be used for metathesis reactions. Optionally, at an appropriate time, one can then react the anionic end with a monomer or polymer that has a group capable of initiating cationic polymerization to add another polyphosphazene block. Examples of these monomers include vinyl ether and butadiene. The monomer must undergo a living polymerization to have ABA block formation of phosphazeneorganic-phosphazene polymer in this manner.

In a third embodiment for the preparation of block copolymers, initiators for the phosphazene polymerization can be included in other polymer systems. For example, an organic polymer with an $N=PR_3$ endgroup can be used to initiate phosphazene polymerization.

DETAILED DESCRIPTION OF THE INVENTION

I. Definitions

The term biologically active molecule or material as used herein refers to an organic molecule including a drug, a protein, polysaccharide, nucleoprotein, lipoprotein, synthetic polypeptide, or a small molecule linked to a protein, carbohydrate, glycoprotein, steroid, nucleic acid, nucleotide, nucleoside, oligonucleotides (including antisense oligonucleotides), cDNA, nucleic acids, genes, vitamins, including vitamin C and vitamin E, lipid, or combination thereof, that causes a biological effect when administered in vivo to an animal, including but not limited to birds and mammals, including humans. The term drug, as used herein, refers to any substance used internally or externally as a medicine for the treatment, cure, or prevention of a disease or disorder, and include but are not limited to immunosuppressants, antioxidants, anesthetics, chemotherapeutic agents, steroids (including retinoids), hormones, antibiotics, antivirals, antifungals, antiproliferatives, antihistamines, anticoagulants, antiphotoaging agents, melanotropic peptides, nonsteroidal and steroidal anti-inflammatory compounds.

The term aliphatic, as used herein, refers to a hydrocarbon, typically of $C_1$ to $C_{20}$, that can contain one or a combination of alkyl, alkenyl, or alkynyl moieties, and which can be straight, branched, or cyclic, or a combination thereof. A lower aliphatic group is typically from $C_1$ to $C_5$.

The term alkyl, as used herein, unless otherwise specified, refers to a saturated straight, branched, or cyclic, primary, secondary, or tertiary hydrocarbon, preferably of $C_1$ to $C_{20}$, and specifically includes methyl, ethyl, propyl, isopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, and 2,3-dimethylbutyl. The alkyl group can be optionally substituted with one or more moieties selected from the group consisting of hydroxyl, amino, alkylamino, arylamino, alkoxy, aryloxy, nitro, cyano, sulfonic acid, sulfate, phosphonic acid, phosphate, or phosphonate, either unprotected, or protected as necessary, as known to those skilled in the art, for example, as taught in Greene, et al., "Protective Groups in Organic Synthesis," John Wiley and Sons, Second Edition, 1991. The term lower alkyl refers to an alkyl group of from $C_1$ to $C_5$.

The term alkylamino or arylamino refers to an amino group that has one or two alkyl or aryl substituents, respectively.

The term "protected" as used herein and unless otherwise defined refers to a group that is added to an oxygen or nitrogen atom to prevent its further reaction during the course of derivatization of other moieties in the molecule in which the oxygen or nitrogen is located. A wide variety of oxygen and nitrogen protecting groups are known to those skilled in the art of organic synthesis.

The term amino acid as used herein, refers to a natural or synthetic amino acid, and includes, but is not limited to alanyl, valinyl, leucinyl, isoleucinyl, prolinyl, phenylalaninyl, tryptophanyl, methioninyl, glycinyl, serinyl, threoninyl, cysteinyl, tyrosinyl, asparaginyl, glutaminyl, aspartoyl, glutaoyl, lysinyl, argininyl, and histidinyl. The term amino acid ester refers to the aliphatic, aryl or heteroaromatic carboxylic acid ester of a natural or synthetic amino acid.

The term aryl, as used herein, and unless otherwise specified, refers to phenyl, biphenyl, or naphthyl, and preferably phenyl. The aryl group can be optionally substituted with one or more moieties selected from the group consisting of hydroxyl, amino, alkylamino, arylamino, alkoxy, aryloxy, nitro, cyano, sulfonic acid, sulfate, phosphonic acid, phosphate, or phosphonate, either unprotected, or protected as necessary, as known to those skilled in the art, for example, as taught in Greene, et al., "Protective Groups in Organic Synthesis," John Wiley and Sons, Second Edition, 1991.

The term halo, as used herein, includes chloro, bromo, iodo, and fluoro.

The term heteroaryl or heteroaromatic, as used herein, refers to an aromatic moiety that includes at least one sulfur, oxygen, or nitrogen in the aromatic ring. Nonlimiting examples are furyl, pyridyl, pyrimidyl, thienyl, isothiazolyl, imidazolyl, tetrazolyl, pyrazinyl, benzofuranyl, benzothiophenyl, quinolyl, isoquinolyl, benzothienyl, isobenzofuryl, pyrazolyl, indolyl, isoindolyl, benzimidazolyl, purinyl, carbozolyl, oxazolyl, thiazolyl, isothiazolyl, 1,2,4-thiadiazolyl, isooxazolyl, pyrrolyl, quinazolinyl, pyridazinyl, pyrazinyl, cinnolinyl, phthalazinyl, quinoxalinyl, xanthinyl, hypoxanthinyl, pteridinyl, 5-azacytidinyl, 5-azauracilyl, triazolopyridinyl, imidazolopyridinyl, pyrrolopyrimidinyl, pyrazolopyrimidinyl, adenine, $N^6$-alkylpurines, $N^6$-acylpurines (wherein acyl is C(O)(alkyl, aryl, alkaryl, or aralkyl), $N^6$-benzylpurine, $N^6$-halopurine, $N^6$-vinylpurine, $N^6$-acetylenic purine, $N^6$-acyl purine, $N^6$-hydroxyalkyl purine, $N^6$-thioalkyl purine, thymine, cytosine, 6-azapyrimidine, 2-mercaptopyrimidine, uracil, $N^5$-alkylpyrimidines, $N^5$-benzylpyrimidines, $N^5$-halopyrimidines, $N^5$-vinylpyrimidine, $N^5$-acetylenic pyrimidine, $N^5$-acyl pyrimidine, $N^5$-hydroxyalkyl purine, and $N^6$-thioalkyl purine, and isoxazolyl. Functional oxygen and nitrogen groups on the heterocyclic base can be protected as necessary or desired during the reaction sequence. Suitable protecting groups are well known to those skilled in the art, and include trimethylsilyl, dimethylhexylsilyl, t-butyldimethylsilyl, and t-butyldiphenylsilyl, trityl, alkyl groups, acyl groups such as acetyl and propionyl, methylsulfonyl, and p-toluylsulfonyl.

The term alkylheterocyclic or alkylheteroaromatic refers to a moiety in which the alkyl group is covalently attached to the heteroaromatic, is preferably $C_1$ to $C_4$ alkylheteroaromatic, and more preferably $CH_2$-heteroaromatic.

The term aralkyl, as used herein, refers to an aryl group with an alkyl substituent.

The term alkoxy, as used herein, and unless otherwise specified, refers to a moiety of the structure —O-alkyl.

The term alkynyl, as referred to herein, refers to a $C_2$ to $C_{10}$ straight or branched hydrocarbon with at least one triple bond.

The term protected-oxy refers to an oxygen atom that has been protected from undesired reactions with any of the oxygen protecting group known to those skilled in the art, including but not limited to, for example, a trisubstituted silyl group such as trimethylsilyl, dimethylhexylsilyl, t-butyldimethylsilyl, t-butyldiphenylsilyl, trityl, alkyl group, acyl groups such as acetyl, propionyl, benzoyl, p-$NO_2$ benzoyl, toluyl, methylsulfonyl, or p-toluylsulfonyl.

The term heteroalkyl, as used herein, refers to an alkyl group that includes a heteroatom such as oxygen, sulfur, or nitrogen (with valence completed by hydrogen or oxygen) in the carbon chain or terminating the carbon chain. Examples of these compounds include a series of lower alkyls interrupted by a heteroatom such as oxygen, sulfur or nitrogen, including —O—[(alkyl)O]$_x$—$CH_2$)$_y$$NH_2$, wherein the alkyl group can vary within the moiety, including —O—[($CH_2$)$_x$O]$_y$—$CH_2$)$_x$$NH_2$; —O—[($CH_2$)$_x$O]$_y$$CH_2$)$_x$NH ($CH_2$)$_x$$SO_3$H, and —O—[(alkyl) —O]y—(alkyl), wherein the alkyl group can vary within the moiety, including —O—[($CH_2$)$_x$O]$_y$—(alkyl), wherein x is 1–8 (which can vary within the moiety) and y is an integer of 1 to 40. Specific examples of these compounds include (methoxyethoxy) ethoxy, ethoxyethoxy and methoxyethoxy.

A process for the preparation of polyphosphazenes is provided that includes the cationic solution polymerization reaction of a phosphoranimine, using a main group or transition metal halide, or other appropriate halide salt, including a linear phosphazene salt of any chain length as an initiator. This process represents a significant advance in the art of synthesis of polyphosphazenes, in that it provides a new degree of control over the molecular weight of the product, and provides a product with narrow polydispersity.

Poly(dichloro)phosphazene with a polydispersity of 1.6 or less (for example, 1.4, 1.2, 1.1, or 1.05 or less), and corresponding poly(organophosphazenes) with a polydispersity of 1.2 (for example 1.1 or 1.05) or less can be prepared using this method.

This invention is disclosed in the following detailed description, and is illustrated in the working examples. The working examples are merely illustrative of selected specific embodiments of the invention, and are not intended to be construed to limit its scope. Given the disclosure, one of ordinary skill in the art can routinely modify the process as necessary or desired. All of these modifications are considered to fall within the scope of the present invention.

II. Selection of Phosphoranimine

A phosphoranimine is used as the monomer in the preparation of the polyphosphazene. In a preferred embodiment, the phosphoranimine is of the structure:

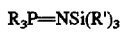

$R_3P=NSi(R')_3$ wherein at least one R substituent is chloro, bromo, or iodo, and preferably chloro, and the remaining R and R' substituents are any groups that do not contain functional moieties that would adversely affect the polymerization process. In a preferred embodiment, at least two R substituents are halo, and preferably chloro. A preferred phosphoranimine is trichloro(trimethylsilyl)phosphoranimine, $Cl_3P=NSiMe_3$.

Examples of moieties that do adversely affect the polymerization process include —NH, —OH, acidic groups, bases, labile fluorine atoms, organolithium reagents and grignard reagents. At least some of these moieties can be converted into noninterfering groups by conventional protection, followed by deprotection at an appropriate time. The interfering groups are typically those that react with the propagating end group, presumably the $P^+Cl_3^-$ unit.

In one embodiment, R is independently (and protected as necessary) chloro, bromo, iodo, aliphatic, including alkyl, alkenyl, or alkynyl; aralkyl, alkaryl, aryl, heteroalkyl, heteroaryl, cyano, amino acid ester, carboxylic acid ester, -oxyaryl including but not limited to -oxyphenyl-p-methyl, protected -oxyphenylCO$_2$H, protected -oxyphenylSO$_3$H, -oxyphenylhydroxyl and -oxyphenylPO$_3$H; oxyaliphatic, including -oxyalkyl, -oxy(aliphatic)CO$_2$H, -oxy(aliphatic)SO$_3$H, -oxy(aliphatic)PO$_3$H, and -oxy(aliphatic)hydroxyl, including -oxy(alkyl)hydroxyl; -oxyalkaryl, -oxyaralkyl, -thioaryl, -thioaliphatic including -thioalkyl, -thioalkaryl, aliphatic and aryl ketone, phosphine oxide or phosphoryl compound (P=O), ether, sulfone and sulfoxide.

If the R group attached to the phosphorus atom is bulky, it may affect the tacticity of the polymer. For example, one may obtain a syndiotactic or isotactic polyphosphazene by appropriate selection of the R group. Bulky groups such as aryl or napthyl groups may polymerize in a syndiotactic arrangement. The large groups may preferentially alternate the side of the phosphorus they are on to minimize steric interactions.

R' is preferably independently aliphatic, preferably lower alkyl, aryl, aralkyl, or alkaryl. In a preferred embodiment, R' is lower alkyl. Nonlimiting examples of the —Si(R')$_3$ moiety include trimethylsilyl, triphenylsilyl, aryldialkylsilyl, and t-butyldimethylsilyl.

During the reaction, one of the R groups on the phosphorus of the phosphoranimine, typically a halogen such as chlorine, will be removed and the remaining two R groups on the phosphorus atom will become the substituents on the resulting polyphosphazene. For example, if a —PCl$_3$ moiety is present in the phosphoranimine, a polydichlorophosphazene will be produced. If, for example, a —PCl$_2$alkyl or —PCl$_2$aryl group is present, a —[N=P(Cl(alkyl)]$_n$— or —[N=P(Cl(aryl)]$_n$—, respectively, will be produced.

A phosphoranimine should be selected that is stable to trimerization. If the substituent groups are collectively too large, a trimer is favored over a polymer. However, if the initiator is a linear phosphazene longer than three repeat units, the molecule cannot trimerize. However, under certain circumstances, it is possible that initiators of this size can inhibit polymerization.

In one embodiment, at least one R' group is selected that is chiral, to promote chiral polymerization.

If the anion is chiral and maintains a close association with the chain end, the anion may affect the tacticity of the polymer chain. An example is $PCl_4R^+$ where R is chiral. The phosphoranimine is $Cl(R)(R')P=NTMS$, where R does not equal R'.

Phosphoranimines can be prepared according to known methods, for example, as described in Honeywell's 1992 Master's Thesis; Honeyman, et al., *Inorg. Chem.*, 1994, 33, 2988; and Niecke, et. al., *Inorg. Nucl. Chem. Lett.*, 1973, 9, 127.

III. Selection of Initiator

The polymerization initiator is a cationic species that contains a halide counterion, preferably chloride, that will facilitate the removal of —Si(R')$_3$ from the phosphoranimine.

In one embodiment, the reaction initiator is a main group or transition metal halide, or other appropriate halide salt. For example, the initiator can be $MX_nY_m$ or $EX_nY_m$, wherein M is a transition metal element (including but not limited to Ti, V, Cr, Zr, Nb, Hf, Ta, W, Mo, Mn, Fe, Ru, Os, Co, Rh, Ir, Ni, Pd, Pt, Cu, Zn, Cd and Hg), E is a main group element (including, but not limited to P, Si, As and Ge), X is a halide, Y is any inorganic or organic substituent that does not adversely affect the initiation or polymerization reaction (including but not limited to aliphatic such as alkyl, and aryl), n is 1 to the valence state of M or E, and m is the valence state minus n. For example, in phosphorous pentachloride (PCl$_5$), the valence state of phosphorous is 5, and in WX$_6$, the valence state of W is 6. Examples are PCl$_5$, TiCl$_4$ (which may lead to branched polymers), TaCl$_5$ (slower than PCl$_5$), SO$_2$Cl$_2$, AlCl$_3$, VCl$_4$, BF$_3$, SnCl$_4$, SbCl$_4$, ZnCl$_4$, (Ph)$_3$CPF$_6$, (Ph)$_3$CSbF$_6$, oxyhalides such as POCl$_3$, CrO$_2$Cl, SOCl$_2$, and VOCl$_3$.

Nonlimiting examples of linear phosphazene salts that can be used as initiators are $Cl_3P=N=PCl_3+A^-$, wherein A is any counteranion that does not adversely affect the reaction (including but not limited to halo, $PX_6^-$), and preferably chloride or $PCl_6^-$; and $(R)Cl_2P=N=(PCl_3)^+A^-$, for example, $RCl_2P=N=PCl_3+PCl_6^-$.

In an alternative embodiment, a linear phosphazene salt is used as an initiator that is in itself an oligomer. For example, the salt $[Cl_3P=N=PCl_3]^+[PCl_6]^-$ can be reacted with a selected ratio of equivalents of $Cl_3P=NSiMe_3$ to produce longer cationic P-N chains. Linear phosphazene salts of seven monomeric units are typically the highest in the oligomer series that can be obtained as single products. Above this, mixtures of 9 and 11, or 11 and 13, or 11, 13 and 15 member chains are typically obtained. The series of addition reactions leads to a clean stepwise synthesis of various P-N salts by the elimination of ClSiMe$_3$. To obtain the 3, 5 and 7 member chains, one equivalent at a time is added. However, to obtain larger chains, all of the equivalents can be added at once. Other oligomeric phosphazene salts, such as $[RCl_2P=N=PCl_3^+]A^-$ and $R_3P-(N=P(R')(R')_z N=PR'_2Cl]^+A^-$ where z is 1–7 can be prepared analogously. The use of a linear oligomeric phosphazene salt as an initiator represents one method for the preparation of a polyphosphazene block copolymer.

Among the advantages of the use of a linear phosphazene salt is that it is easier to purify and easier to functionalize than metal salts. Further, the solubility of the phosphazene salt can be increased by increasing the chain length as desired.

EXAMPLE 1

Preparation of Trichloro(trimethylsilyl) phosphoranimine Cl$_3$P=N—SiMe$_3$

The synthesis of trichloro(trimethylsilyl) phosphoranimine Cl$_3$P=N—SiMe$_3$ is reported in Honeyman, C. H., "En Route to New Inorganic Rings and Polymers; The Reactions of Cl₂RP=NSiMe₃ (R=Cl or Ph) with Main Group and Transition Metal Chlorides," MS Thesis, Department Of Chemistry, University of Toronto, 1992. The synthesis involves the dropwise addition of a single equivalent of LiN(SiMe₃)₂ in hexanes to a vigorously stirred cold (−78° C.) slurry of PCl₅ in hexanes. Purification of the reaction products by distillation gives the product as a clear, colorless, moisture sensitive liquid distillate.

EXAMPLE 2

Preparation of Dichloro(phenyl)-(trimethylsilyl) phosphoranimine Cl₂PhP=N—SiMe₃

The procedure used to prepare this compound was analogous to that described in Example 1 for Cl₃P=N—SiMe₃ except as follows. To tetrachlorophenylphosphorane (80 g, 0.32 mol) in hexanes (1000 ml) at −78° C. was added dropwise a solution of lithium bis-trimethylsilyl)amide, LiN (SiMe₃)₂ (53 g, 0.32 mol) in hexanes (500 ml) with mechanical stirring. The clear, colorless product was distilled (bp 53° C., 0.02 mm Hg) and was identified as Cl₂PhP=N—SiMe₃. Yield 47.0 g (55%). $^{31}$P NMR (CH₂Cl₂) d-11.8 ppm; $^{13}$C NMR (CDCl₃) d 133.2 ppm (d, $^{4/}$CP=4 Hz, p-Ph), d 130.7 ppm (d, $^{3/}$CP-13 Hz, m-Ph), d 128.7 ppm (d, $^{2/}$CP=19 Hz, o-Ph), d 1.9 ppm (d, $^{4/}$CP=7 Hz, CH₃), ipso-Ph not observed; $^{1}$H NMR (CDCl₃) d 8.0 ppm (d of d, $^{3/}$HP=19 Hz, $_{2J}$HH$_{(om)}$=Hz, 2H, o-Ph), d, 7.5 ppm (br., 3H, p-and m-Ph), d 0.2 ppm (d, $^{4/}$HP=3 Hz, 9H, CH₃)

EXAMPLE 3

Preparation of [Cl₃P=N=PCl₃][PCl₆] By Reaction of 2 Equivalents of PCl₅ with 1 Equivalent of Cl₃P=N—SiMe₃

Two equivalents of phosphorus pentachloride (3.6 g, 17 mmol) were dissolved in dichloromethane (50 ml) and the resulting stirred solution was cooled to −78° C. A single equivalent of Cl₃P=N—SiMe₃ (2.0 g, 9 mmol) was added quickly to the syringe and the reaction mixture was immediately allowed to warm to room temperature. The solvent was removed in vacuo resulting in a fine white powder which was identified as [Cl₃P=N=PCl₃][PCl₆].

Yield 4.3 g (90%). $^{31}$P NMR (CH₂Cl₂) d 22.4 ppm =PCl₃, d −293.6 ppm [PCl₆]⁻

EXAMPLE 4

Preparation of [Cl₃P=N—PCl₂—N=PCl₃][PCl₆] By Reaction of 1 Equivalent of [Cl₃P=N=PCl₃] [PCl₆] with 1 Equivalent of Cl₃P=N—SiMe₃

The salt [Cl₃P=N=PCl₃][PCl₆] (1.5 g, 3 mmol) was dissolved in dichloromethane (50 ml) and the resulting stirred solution was cooled to −78° C. Cl₃P=N—SiMe₃ (2.0g, 9 mmol, 1 eq.) was added quickly by syringe and the reaction mixture was immediately allowed to warm to room temperature. The solvent was removed in vacuo resulting in a fine white powder which was identified as [Cl₃P=N— PCl₂—N=PCl₃][PCl₆]. Yield 1.8 g (92%). ⁻P NMR (CH₂Cl₂) d 14.6 ppm (d, $^{2}J_{pp}$ 45 Hz)=PCl₃, d −10.5 ppm (t, $^{2}J_{pp}$ 45 Hz) —PCl₂—, d −293.6 ppm [PCl₆]⁻

IV. Conditions of Polymerization

The disclosed route for the preparation of polyphosphazenes provides an opportunity for control over polymer molecular weight and structure, and allows access to polyphosphazenes with narrow polydispersities. The synthetic route described herein can produce products ranging from oligomers to high molecular weight polymers. A typical molecular weight range of the polymers is between approximately 10³ and 10⁶, but others outside this range can also be prepared. Importantly, the process can be carried out at or near ambient temperatures.

The route described herein for the preparation of polyphosphazenes is considerably less complicated and less expensive in terms of the chemicals required and the temperatures needed than any of the alternatives currently available. Moreover, the relative ease of preparation and the access to provided new polyphosphazenes are of fundamental importance in the field of polyphosphazene chemistry both academically and industrially.

This method allows for the recycling of ClSiMe₃, which is important economically and environmentally. This, together with the large scale availability of the starting materials ClSiMe₃ and PCl₅ or RPCl₄ offers favorable prospects for the large scale synthesis of polyphosphazenes, and for a marked expansion in the availability and utility of poly(phosphazenes).

The procedure for carrying out the solution reaction is quite simple and easy to accomplish on a manufacturing scale. The selected phosphoranimine is mixed with solvent, and then a small amount of initiator is added, and the solution is stirred. It is important that the reaction mixture be a homogeneous solution in order to obtain a narrow PDI. The initiator, and phosphoranimine, initial oligomers formed and polymer product should be soluble to maintain molecular weight control and a narrow PDI. Therefore, solubility limits the choice of monomer and initiator. It is preferable to pretreat glass or glass-lined reaction vessels with a silating reagent such as TMS-Cl prior to running the reaction.

The reaction is carried out in any organic solvent that does not adversely affect the polymerization reaction, i.e., it must be inert under the conditions of reaction. It should also be dry. Dichloromethane and other halogenated inert solvents are preferred solvents for the solution synthesis of polydichlorophosphazene. Other suitable solvents include, but are not limited to, glyme, diglyme, toluene, acetonitrile, and dioxane.

The choice of solvent will affect the molecular weight distribution of the product. If dioxane is used, multimodal GPC traces can be obtained. If too little solvent is used (for example, not enough to bring all of the reactants into solution) the polymerization can resemble that occurring under neat (i.e., bulk) conditions with resulting multimodal GPC traces.

The reaction can be carried out at any desired temperature that does not unduly affect the reactants or product. Importantly, most of the polymerization reactions do not require heat at all. The reaction is typically carried out at temperature ranging between 20° and 23° C.

The molecular weight of the product can be controlled, for example, by the choice of initiator, the monomer/initiator ratio, by the addition of monomer to preformed active or living chains, or by the control of the time of the reaction.

Any ratio of phosphoranimine to initiator can be used that provides the desired product. In one embodiment, between 100 and 5 moles of monomer to 1 mole of initiator are used, and preferably, between 20 and 5 moles of monomer. As the ratio of initiator to phosphoranimine increases, the molecular weight of the product decreases. PCl₅ and Cl₃PNPCl₃⁺ A⁻ are preferred initiators.

The reaction is carried out for any amount of time that provides the desired product. In general, reaction times of between approximately 6 and 24 hours are typical, however, the polymerization reaction may be complete in under two hours.

The reaction can be carried out at ambient pressure or reduced pressure, in air or in an inert atmosphere such as $N_2$, as appropriate for the starting material and product.

The control over molecular weight and the very narrow polydispersity that can be obtained using this method distinguishes it from the corresponding bulk (i.e., without solvent) method, as described in more detail in Example 5.

EXAMPLE 5

Comparison of Bulk and Solution Polymerization of Phosphoranimine

It was postulated that the treatment of $Cl_3P=NSiMe_3$ with trace quantities of $PCl_5$ might afford high molecular weight poly(dichlorophosphazene), and that control over the ratio of the phosphoranimine to $PCl_5$ might allow for the control of the molecular weight of the polymer produced. The addition of a trace $PCl_5$ (ca 10 mg) to pure $Cl_3P=NSiMe_3$ (1.0 g) at room temperature led after 5 days to the formation of a two-phase mixture. Both phases were clear and colorless but the upper, more fluid layer, was found, by $^1H$ NMR spectroscopy, to consist mainly of $Me_3SiCl$. A $^{31}P$ NMR spectrum of the entire tube contents showed predominantly a sharp singlet characteristic of poly-dichlorophosphazene. Thus, the conversion of $Cl_3P=NSiMe_3$ to linear polymer was essentially quantitative. The poly(dichlorophosphazene) product was treated with an excess of $NaOCH_2CF_3$, and the resultant polymer gave a $^{31}P$ NMR signal characteristic of a well known polymer, $[N=P(OCH_2CF_3)2]n$. Analysis of this polymer by gel permeation chromatography (GPC) indicated that it possessed only a high molecular weight fraction having $M_w=2.1\times10^5$ and a polydispersity index $(PDI=M_w/M_n)=1.8$ versus polystyrene standards. However, in subsequent attempts to obtain lower molecular weight poly (dichlorophosphazene) by increasing the ratio of $PCl_5$ to monomer with the same solvent-free conditions, the initiator and initial cationic products remained primarily insoluble. The molecular weight values of the polymers produced were lower than in the above experiment, but the GPC trace of this polymer was multimodal. The results suggested a lack of molecular weight control in the solvent-free system due to the heterogeneous nature of the process.

In contrast, the reaction of $Cl_3P=NSiMe_3$ with traces of $PCl_5$ in a methylene chloride solution resulted in a quantitative conversion to poly(dichlorophosphazene) (as estimated by $^{31}P$ NMR spectroscopy and GPC analysis of the trifluoroethoxy derivatives $[N=P(OCH_2CF_3)2]n$) with a very narrow polydispersity. An increase in the ratio of phosphoranimine to $PCl_5$ in solution resulted in an increase in the molecular weight while still retaining narrow PDI values, as indicated in Table 1 below.

TABLE 1

| Sample | $PCl_5$ | $Cl_3P=NSiMe_3$ | Mon/Init | $M_w$ | PDI |
| --- | --- | --- | --- | --- | --- |
| Bulk 1 | ~10 mg | 1.0 g | 100 | 21000 | 1.8 |
| Bulk 2 | 110 mg | 1.6 g | 14.5 | 41000 | 2.3* |
| Solution 3 | 200 mg | 1.0 g | 5 | 7000 | 1.20 |
| Solution 4 | 100 mg | 1.0 g | 10 | 11000 | 1.04 |
| Solution 5 | 29 mg | 0.6 g | 21 | 14000 | 1.04 |

*multimodal GPC trace

The analogous reaction between a trace of $PCl_5$ and $PhCl_2P=NSiMe_3$ in the bulk state at room temperature also yielded a polymeric product. In this case the polymerization resulted in the formation of poly[aryl(chloro)phosphazene], $[N=P(Ph)\ Cl]$, which was converted to the known macromolecule $[N=P(Ph)(OCH_2CF_3)]_n$ with $M_n=8.0\times10^4$ and polydispersity of 1.4.

EXAMPLE 6

Preparation of Polydichlorophosphazene from Trichloro(trimethylsilyl)phosphoranimine The solution polymerization of trichloro(trimethylsilyl) phosphoranimine was carried out according to the following general procedure. All glassware was pretreated with 5% $ClSiMe_3$ in hexanes and dried under vacuum. The $Cl_3P=NSiMe_3$ was sublimed prior to use and stored under nitrogen. A solution of $PCl_5$ (100 mg) in $CH_2Cl_2$ (10 mL) was added to a stirred solution of $Cl_3P=NSiMe_3$ (1.0 g, 4.4 mol) in $CH_2Cl_2$(35 mL) under nitrogen. The solution was stirred for 24 hours. The products were analyzed by $^{31P\ NMR}$.

The analyses were performed using the techniques and instruments set forth below. $^1H$ NMR (360.0 Mhz), $^{13C\ NMR}$ (90.0 MHz), and $^{31}P$ NMR (145.8 MHz) spectra were obtained using a Bruker WM-360 MHz spectrometer. Chemical shifts are relative to tetramethylsilane at $\delta=0$ for proton and carbon. The phosphorus chemical shifts are relative to 85% $H_3PO_4$ at $\delta=0$, with positive shift values downfield from the reference. All heteronuclear NMR spectra were proton decoupled.

Molecular weights were determined using a Hewlett-Packard HP 1090 gel permeation chromatograph equipped with an HP-1037A refractive index detector and Polymer Laboratories PL gel 10 μm columns. The samples were eluted with a 0.1% by weight solution of tetra-n-butylammonium bromide in THF. The GPC column was calibrated with polystyrene standards (Waters).

The results are provided in Table 1.

EXAMPLE 7

Preparation of Polychloro(phenyl)phosphazene from Dichloro(phenyl)(trimethylsilyl)phosphoranimine Polychloro(phenyl)phosphazene was prepared according to the bulk polymerization method described in Example 5, using $Cl_2PhP=NSiMe_3$ instead of $Cl_3P=NSiMe_3$. Treatment of this polymer with sodium trifluoroethoxide resulted in a polymer identical with literature reports. The weight average molecular weight was $8.0\times10^4$ and the polydispersity $(M_w/M_n)$ was 1.4.

V. Endcaps

The chain ends of the growing polymer in this process are active throughout the duration of the polymerization as well as active after the total consumption of the monomer. By "active" it is meant that the ends are in a reactive state, and specifically, in a cationic state. They are thus available as additional reaction sites for polymerization or derivatization.

In one embodiment, a desired moiety is reacted with the cationic polymer end to affect a physical property of the polymer such as solubility, glass transition temperature, lipophilicity, morphology, creep, crystallinity, bulk modulus, viscosity, conductivity, refractive index or thermal stability. The chain ends can be deactivated in any appropriate fashion, for example, with an oxygen source or by nucleophiles. The polymer can be reacted with, for example, $SO_3$, NaOR, or $NH_2R$, wherein R is an aliphatic or aromatic group. $SO_3$ can react selectively with the end group to deactivate propagation. NaOR and $NH_2R$ may react with the end group and the polymer chain indiscriminately. However, the use of these compounds in producing polymers makes these convenient choices. Hydride sources may also selectively react with the endgroup.

In one embodiment, a moiety is reacted with the cationic polymer end that contains a second functional group that can be used to link another desired moiety to the polymer. Non-limiting examples of second active functional groups include, but are not limited to (and protected as necessary) amines, imines, alkylsiloxysilane, hydroxyl, carboxylic acid, carboxylic acid chlorides, carboxylic acid anhydrides, amides, esters, sulfonic acid, sulfonic acid chlorides, phosphonic acid, phosphonic acid chloride, halogen or alkyl halides, alkyaes, ethers, aldehydes, ketones, heteroaromatic compounds including pyridine, nitriles, amines, ammonium salts, and silanes.

In an alternative embodiment, a moiety can be added to the polymer that imparts specific biological properties to the polymer, such as cationic charge (e.g., polylysine or other positive charge-bearing species, for tissue adherence), or provides a site for the attachment of a biologically active molecule, including but not limited to an antibody, antigen, protein, polysaccharide, nucleoprotein, lipoprotein, synthetic polypeptide, or a small molecule linked to a protein, steroid, nucleic acid, nucleotide, nucleoside, oligonucleotide (including antisense oligonucleotides), cDNA, nucleic acid, or gene.

EXAMPLE 8

Activity of Growing Polyphosphazene Chain

The activity of the growing polymer chain of polydichlorophosphazene was investigated. A solution of poly (dichlorophosphazene) in $CH_2Cl_2$ was prepared in which all of the phosphoranimine had been converted to polymer as determined by $^{31}P$ NMR spectroscopy. A portion of this was subjected to halogen replacement to yield a trifluoroethoxy-substituted polymer with an $M_w=1.1 \times 10^4$ with a PDI=1.04. A further addition of phosphoranimine to the remainder of the original (unsubstituted) solution resulted in the continued conversion of $Cl_3P=NSiMe_3$ to polymer over 48 hours. The GPC trace of the trifluoroethoxy-derivatized polymer from this solution showed the presence of polymer with a $M_w=9.2 \times 10^5$ with a PDI=1.71. Thus, it appears that the active chain ends can resume chain growth following the addition of more monomer. This opens up many possibilities for control over the chain length and coupling of the chain ends to other monomers or polymers.

VI. Block Copolymerization of Polyphosphazenes

The method of preparation of polyphosphazenes disclosed herein provides a route for the first time to a wide variety of phosphazene block copolymers. Using the prior art methods, the only known block copolymers were [NP(OR$_1$)$_2$]$_x$[NP(OR$_1$)(OR$_2$)]$_y$, wherein R$_1$ is halogenated alkoxy and R$_2$ is an aliphatic or aryl moiety. It is now possible to obtain block copolymers other than these limited polymers.

Block copolymers of polyphosphazenes can be prepared using at least three different methods. In a first embodiment, a block copolymer is prepared by the cationic polymerization of monomers initiated by the active end groups of the polyphosphazene. Any monomer or polymer capable of reacting with a cationic site can be used. Examples of monomers that react by cationic mechanisms include epoxides, oxiranes, episulfides, trioxanes, tetrahydrofurans, vinyl ethers, acrolein, and other olefins capable of cationic polymerization, such as 1-alkyl olefins (α-olefins), 1,1-dialkyl olefins, 1,3-dienes, styrene, α-methyl styrene, N-vinyl carbazole, N-vinyl pyrrolidone, and aldehydes and ketones. Additionally, other phosphazene monomers can be used to create phosphazene-phosphazene blocks. The active organic block can then be reacted with additional phosphoranimine monomer, that is the same as or different from that used in the first phosphazene polymer block. This procedure can be continued as long as desired using any variety of cationic organic and phosphoranime monomers, or different phosphoranimine monomers without organic blocks. Blocks should be added prior to substitution, since substitution can deactivate the chain ends.

In a second embodiment for the production of block copolymers of polyphosphazenes, functionalized compounds are reacted with the active polyphosphazene end that have a moiety that will initiate a reaction mechanism other than cationic polymerization, for example, anionic or radical initiation. Any initiator that can be attached to the end of a polymer chain and is incorporated into the second block can be used. For example, endcaps with bromophenyl moieties can be converted to an appropriate organometallic species, for example, grignard or organolithium reagents, to initiate anionic polymerization of appropriate monomers. Alkene moieties can be used for metathesis reactions. Optionally, at an appropriate time, one can then react the anionic end with a monomer or polymer that has a group capable of initiating cationic polymerization to add another polyphosphazene block. Examples of these monomers include vinyl ether and butadiene. The monomer must undergo a living polymerization to have ABA block formation of phosphazene-organic-phosphazene in this manner. For example, the use of endcaps that contain haloalkyl or haloaryl moieties, for example, bromophenyl moieties, can be converted to an appropriate organometallic reagent, such as a grignard or organolithium reagent, to allow for the anionic polymerization of monomers that polymerize through anionic mechanisms, such as styrene siloxanes, ethylene, acrylates, methacrylates, acrylamide, methacrylamide, acrylonitrile, and methacrylonitrile. Optionally, at an appropriate time, one can then react the anionic end with a monomer or polymer that has a group capable of initiating cationic polymerization to add another polyphosphazene block.

In a third embodiment for the preparation of block copolymers, initiators for the phosphazene polymerization can be included in other polymer systems. For example, an organic polymer with an N=PR$_3$ endgroup can be used to initiate phosphazene polymerization.

Modifications and variations of the present invention will be obvious to those skilled in the art from the foregoing detailed description of the invention. Such modifications and variations are intended to come within the scope of the appended claims.

We claim:

1. Poly(dichloro)phosphazene with a polydispersity of 1.2 or less.

2. The poly(dichloro)phosphazene of claim 1 that has a polydispersity of 1.1 or less.

3. The poly(dichloro)phosphazene of claim 1 that has a polydispersity of 1.05 or less.

4. A poly(organophosphazene) that has a polydispersity of 1.2 or less.

5. The poly(organo)phosphazene of claim 4 that has a polydispersity of 1.1 or less.

6. The poly(organo)phosphazene of claim 4 that has a polydispersity of 1.05 or less.

7. A polyphosphazene block copolymer prepared from a phosphoranimine monomer and a second monomer selected from the group consisting of epoxides, oxiranes, episulfides, trioxanes, tetrahydrofurans, vinyl ethers, acrolein, 1-alkyl olefins, 1,1-dialkyl olefins, 1,3-dienes, styrene, α-methyl styrene, N-vinyl carbazole, N-vinyl pyrrolidone, aldehydes and ketones.

8. The polyphosphazene block copolymer of claim 7, that contains a polyalkylene oxide block.

9. The polyphosphazene of claim 8, wherein the polyalkylene oxide is polyethylene oxide.

10. A process for the preparation of a polyphosphazene that comprises the cationic solution polymerization reaction of a phosphoranimine with an initiator selected from the group consisting of a main group halide, a transition metal halide, a linear phosphazene salt, and a preformed nonphosphazene polymer containing a main or transition metal halide, wherein said process is carried out in a dry inert organic solvent.

11. The process of claim 10, wherein the halide is chloride.

12. The process of claim 10, wherein the phosphoranimine is of the structure:

$$R_3P=NSi(R')_3$$

wherein at least one R substituent is chloro, bromo, or iodo, and the remaining R and R' substituents are any groups that do not contain functional moieties that would adversely affect the polymerization process.

13. The process of claim 12, wherein at least two R substituents are halo.

14. The process of claim 13, wherein the halo substituents are chloro.

15. The process of claim 10, wherein the phosphoranimine is trichloro(trimethylsilyl)phosphoranimine ($Cl_3P=NSiMe_3$).

16. The process of claim 12, wherein R is independently (and protected as necessary) chloro, bromo, iodo, aliphatic, including alkyl, alkenyl, or alkynyl; aralkyl, alkaryl, aryl, heteroalkyl, heteroaryl, cyano, amino acid ester, carboxylic acid ester, -oxyaryl including but not limited to -oxyphenyl-p-methyl, protected -oxyphenylCO$_2$H, protected -oxyphenylSO$_3$H, -oxyphenylhydroxyl and -oxyphenylPO$_3$H; oxyaliphatic, including -oxyalkyl, -oxy(aliphatic)CO$_2$H, -oxy(aliphatic)SO$_3$H, -oxy(aliphatic)PO$_3$H, and -oxyoxy(aliphatic)hydroxyl, including -oxy(alkyl)hydroxyl; -oxyalkaryl, -oxyaralkyl, -thioaryl, -thioaliphatic including -thioalkyl, -thioalkaryl, aliphatic and aryl ketones, phosphine oxides or phosphoryl compounds (P=O), ethers, sulfones and sulfoxides.

17. The process of claim 12, wherein R' is independently selected from the group consisting of aliphatic, aryl, aralkyl, or alkaryl.

18. The process of claim 12, wherein R' is lower alkyl.

19. The process of claim 10, wherein the initiator is $MX_nY_m$ or $EX_nY_m$, wherein M is a transition metal element selected from the group consisting of Ti, V, Cr, Zr, Nb, Hf, Ta, W, Mo, Mn, Fe, Ru, Os, Co, Rh, Ir, Ni, Pd, Pt, Cu, Zn, Cd and Hg; E is a main group element selected from the group consisting of P, Si, As and Ge, X is a halide, Y is any inorganic or organic substituent that does not adversely affect the initiation or polymerization reaction, n is 1 to the valence state of M or E, and m is the valence state minus n.

20. The process of claim 10, wherein the initiator is $PCl_5$.

21. The process of claim 10, wherein the initiator is selected from the group consisting of $TiCl_4$, $TaCl_5$, $SO_2Cl_2$, $AlCl_3$, $VCl_4$, $BF_3$, $SnCl_4$, $SbCl_4$, $ZnCl_4$, $(Ph)_3CPF_6$, $(Ph)_3CSbF_6$, $POCl_3$, $CrO_2Cl$, $SOCl_2$, and $VOCl_3$.

22. The process of claim 10, wherein the initiator is selected from the group consisting of $Cl_3P=N=PCl_3+A^-$, wherein A is any counteranion that does not adversely affect the reaction and $(R)Cl_2P=N=(PCl_3)^{+A31}$.

23. The process of claim 10, wherein the initiator is $RCl_2P=N=PCl_3+PCl_6^-$.

24. The process of claim 10, wherein the initiator is a linear oligomeric phosphazene salt.

25. The process of claim 10 carried out in ambient conditions.

26. A method for the preparation of a phosphazene block copolymer comprising the steps of:
  (i) polymerizing a first monomer in the form of a phosphoranimine with an initiator selected from the group consisting of a main group halide, a transition metal halide, a linear phosphazene salt, and a preformed nonphosphazene polymer containing a main or transition metal halide to provide a polyphosphazene with an end in a cationic reactive state; and
  (ii) using the cationic reactive end as an initiator to polymerize a second type of monomer onto the polyphosphazene prepared in step (i);
  wherein the second monomer is selected from the group consisting of epoxides, oxiranes, episulfides, trioxanes, tetrahydrofurans, vinyl ethers, acrolein, 1-alkyl olefins, 1,1-dialkyl olefins, 1,3-dienes, styrene, α-methyl styrene, N-vinyl carbazole, N-vinyl pyrrolidone, aldehydes and ketones.

27. A method for the preparation of a phosphazene block copolymer comprising the steps of:
  (i) polymerizing a first monomer in the form of a phosphoranimine with an initiator selected from the group consisting of a main group halide, a transition metal halide, a linear phosphazene salt, and a preformed nonphosphazene polymer containing a main or transition metal halide to provide a polyphosphazene with an end in a cationic reactive state; and
  (ii) using the cationic reactive end as an initiator to polymerize a second type of monomer onto the polyphosphazene prepared in step (i);
  wherein the second monomer is an olefin capable of cationic polymerization.

28. The method of claim 26, wherein the second monomer is a phosphoranimine that is different from the first monomeric phosphoranimine.

29. A method for the preparation of a phosphazene block copolymer comprising the steps of:
  (i) polymerizing a first monomer in the form of a phosphoranimine with an initiator selected from the group consisting of a main group halide, a transition metal halide, a linear phosphazene salt, and a preformed nonphosphazene polymer containing a main or transition metal halide to provide a polyphosphazene with an end in a cationic reactive state; and
  (ii) using the cationic reactive end as an initiator to polymerize a second type of monomer onto the polyphosphazene prepared in step (i);
  wherein the cationic reactive end is reacted with a moiety that will initiate a reaction mechanism other than cationic polymerization with a second monomer.

30. The method of claim 29, wherein the moiety comprises a bromophenyl group.

31. A process for the preparation of a polyphosphazene that comprises the cationic solution polymerization reaction of a phosphoranimine with an initiator selected from the group consisting of a main group halide, a transition metal halide, a linear phosphazene salt, and a preformed nonphosphazene polymer containing a main or transition metal halide; wherein the initiator is selected from the group consisting of $PCl_5$, $TiCl_4$, $TaCl_5$, $SO_2Cl_2$, $AlCl_3$, $VCl_4$, $BF_3$, $SnCl_4$, $SbCl_4$, $ZnCl_4$, $(Ph)_3CPF_6$, $(Ph)_3CSbF_6$, $POCl_3$, $CrO_2Cl$, $SOCl_2$, $VOCl_3$, $RCl_2P=N=PCl_3^+PCl_6^-$, and a linear oligomeric phosphazene salt.

* * * * *